United States Patent Office 3,241,003
Patented Mar. 15, 1966

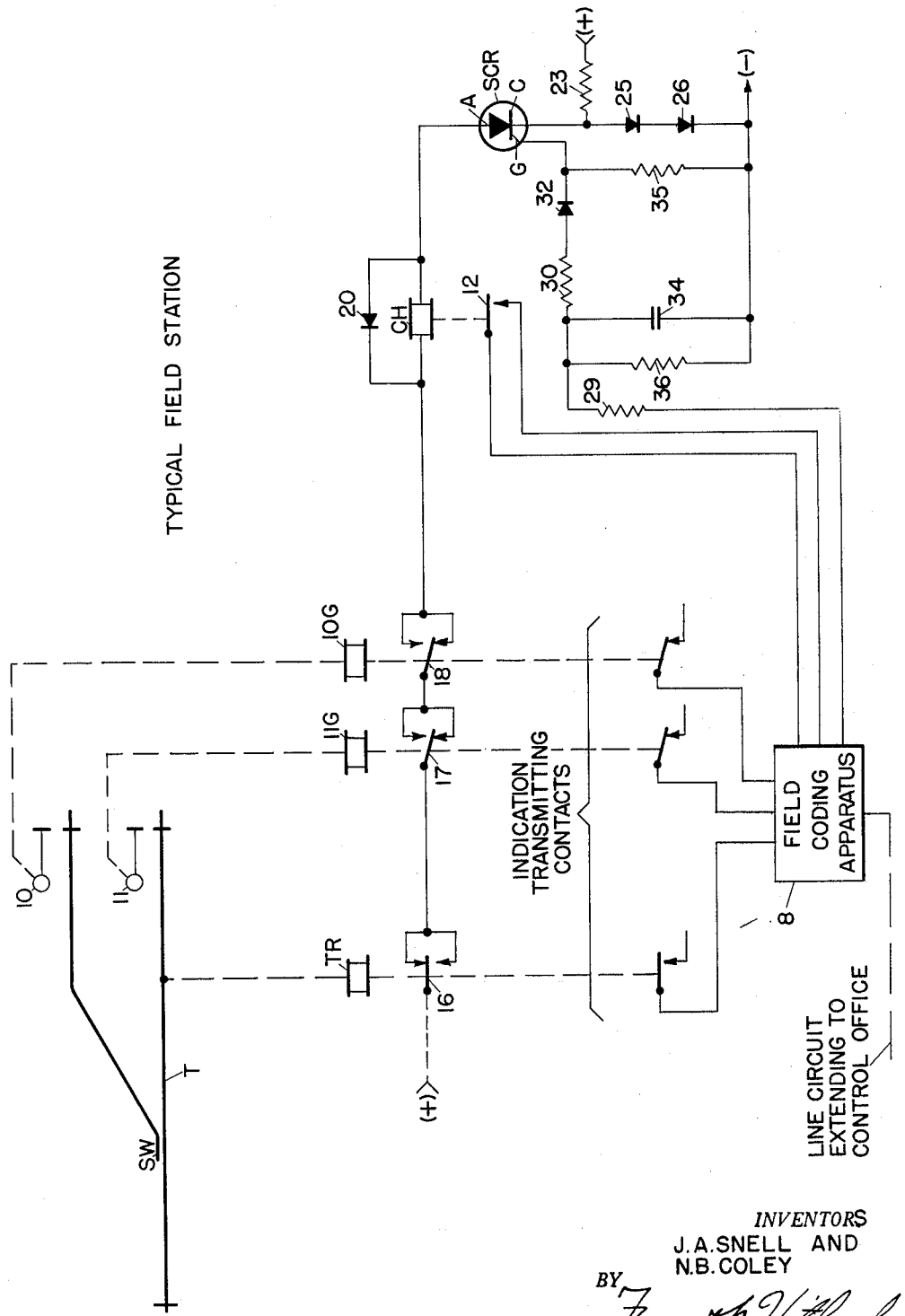

3,241,003
CONTROL CIRCUIT FOR A FIELD START RELAY
IN A CODE TYPE COMMUNICATION SYSTEM
John A. Snell, Rochester, and Nelson B. Coley, Rush,
N.Y., assignors to General Signal Corporation
Filed Dec. 3, 1962, Ser. No. 241,729
3 Claims. (Cl. 317—148.5)

This invention relates to code type communication systems, and, more particularly, pertains to a control circuit for a field start indication relay employed in such systems.

In typical code type communication systems to which this invention relates, code transmitting apparatus at each of a plurality of field stations is utilized for transmitting to a control office indications of the position or condition of various controlling devices at that field location. In this connection, for example, the controlling devices may either be traffice controlling devices as used to direct railroad traffic or may be controlling devices used in connection with pipe-line operations. Thus, the system may either be what is commonly known as a centralized traffic control system or may be a pipe-line supervisory control system. In any event, in order that an indication may be transmitted to a control office as soon as there is any change in the position or condition of one or more controlling devices, it is common practice to provide a suitable automatic field start means to condition the coding apparatus at the field station for operation whenever such change occurs.

In accordance with the present practice, a normally energized neutral relay commonly called a "change" relay is employed as the field start means which is dropped away by a change in the position or condition of a traffic controlling device to initiate the transmission of the new indication. After the indication has been transmitted, the "change" relay is again energized thereby being in condition to respond to another change in the position or condition of any one of the traffic controlling devices at that field station. The energizing circuit for the "change" relay is established through the coding apparatus at the associated field station, while the stick circuit for the "change" relay includes a front contact of such relay and the contacts of the indication relays taken in combination.

In order that the "change" relay be effective to determine the change in position or condition of a controlling device, it must be deenergized during the crossover time of an indication relay corresponding to the control device changed in position or condition. It has been required in the prior art that the "change" relay be of especial design such that it has a quick drop away time so that it can be fully dropped away within the period of crossover time for any indication relay. Even with the especially designed "change" relays, however, it has been found that the dropping away thereof has been somewhat sluggish.

Generally speaking, and without attempting to define the exact nature and scope of the present invention, it is proposed to provide a control circuit for initiating an automatic field start upon the change of any one or more of a plurality of traffic control devices wherein a common neutral relay having a normal crossover time may be employed as the "change" relay which covercomes the above mentioned limitations. More specifically, it is proposed in this invention to include a neutral relay of common design as the "change" relay in the anode circuit of a silicon controlled rectifier which has its control energy connected through the contacts of the indication relay such that the momentary release of one indication relay and its contact interrupts momentarily the anode control energy to cause the silicon control rectifier to become nonconductive thereby causing the "change" relay to drop away.

The primary object of this invention is to provide a control circuit for insuring that each change in the position or condition of a controlling device is determined and transmitted as an indication code to the control office, while yet premitting a neutral relay of common design to be employed as the field start means.

Another object of this invention is to provide a control circuit employable to cause the pick-up of a field start relay and to cause the release of such relay according to the operating characteristics of a silicon controlled rectifier.

Other objects, purposes and characteristic features of the present invention will be in part obvious from the accompanying drawing and in part pointed out as the description of the invention progresses.

The accompanying drawing shows diagrammatically one form of the invention applied to the transmission of indications for traffic controlling devices in connection with a typical railroad passing siding.

In the accompanying drawing, connections to the opposite terminals of a battery or other suitable source of current are indicated by arrows and the symbols (+) and (−).

As pointed out above, the present invention is applicable to any type of code communication system where it is desired to determine the change in position or condition of controlling devices and to transmit that change in the form of indication codes to a control office for indication purposes. One such communication system referred to as a centralized traffic control system is shown and described in the patent granted to W. D. Hailes et al., No. 2,399,734, dated May 7, 1946, to which reference is made for a more detailed description thereof.

In the automatic field start control circuits as described in the above mentioned patent, the desired field start is created when a stick circuit of a normally energized neutral "change" relay is opened by a momentary interruption caused by a change in the position of a traffic controlling device. It is the change of position of the contacts of an associated traffic indication relay which opens the stick circuit, thereby causing the "change" relay to be dropped away. As mentioned, however, the "change" relay must be of especial design so as to have a quick drop away characteristic in order that the change may be determined thereby. Initially, a control is received over the line circuit from the control office to cause the energizing circuit for the "change" relay to be completed, but which is then disconnected so as to permit the stick circuit for the "change" relay to be effective.

Referring now to the drawing, a typical field station is shown which includes a typical track layout comprising a single switch SW assumed to be located at the end of a passing siding of a single track railroad T. The signals 10 and 11 by displaying a stop or proceed indication are assumed to govern traffic going from right to left. The track switch SW is assumed to be operated by the usual power operated switch machine (not shown) to a normal and reverse position.

In the particular arrangement shown, it is assumed that the indications of the "clear" or "stop" condition of the respective signals 10 and 11 and the occupancy of the track section T will be transmitted to a control office over a conventional line circuit. The automatic field start for the signal indications and the nature of the indication to be transmitted are determined by the relays 10G and 11G, while the field start for the track occupancy or non-occupancy is determined by track relay TR.

The field station coding apparatus is shown schematically as block 8 and is conditioned for operation by the dropped away condition of the neutral change relay CH as governed by contact 12 thereof. The coding apparatus 8 is operated in the usual manner, characteristic of systems of this type, to transmit at the approximate time during the operating cycle indications of the then existing condition of the signal indication relays 10G and 11G and the track occupancy relay TR, inasmuch as the contacts associated with these relays 10G, 11G, and TR govern the energization of indication control circuits shown diagrammatically which determine the character of the indication code elements. An indication code is transmitted accordingly with the position of the traffic indication relays by the closure of back contact 12 of change relay CH. The operation of the field coding apparatus is then as disclosed and described in the above mentioned Hailes et al. patent.

The invention hereof includes a control circuit comprising a silicon controlled rectifier designated SCR having an anode A, a cathode C and a gate G. The anode A is connected to positive (+) through the contacts 16, 17 and 18 of respective relays TR, 11G and 10G in combination and through the winding of change relay CH. A diode 20 is connected in shunt with change relay CH to minimize inductive transients according to the operation of change relay CH for protecting rectifier SCR. The cathode C is connected to a biasing circuit including a resistor 23 and diodes 25 and 26. The resistor 23 and diodes 25 and 26 serve to provide hold off bias for rectifier SCR. The gate G of rectifier SCR is connected to the field coding apparatus 8 and to a circuit which is normally employed to pick up relay CH as described in the above mentioned Hailes et al. patent. The positive (+) energy pulse supplied through apparatus 8 is applied to the gate G through resistors 29 and 30 and a diode 32 employed as a steering diode. A capacitor 34 is provided to prevent the SCR from being triggered by any sharp noise pulses that may show up in the input gating circuit. Resistor 35 is for biasing purposes, while resistor 36 is provided for discharging capacitor 34.

In the drawing, the relay CH is shown in a picked up condition. Thus, the field coding apparatus 8 has been operated by the control office to the extent that a positive (+) energy pulse is supplied to the gate G of rectifier SCR to cause conduction therein. In the conducting state of rectifier SCR, a conducting path extends from (+), through front contact 16 of relay TR, through back contact 17 of relay 11G, through back contact 18 of relay 10G, through the winding of relay CH, through rectifier SCR from anode to cathode, to the negative (−) energy through diodes 25 and 26.

When the condition of either signal 10 or 11 changes to cause the respective relay to change in position or the track T becomes occupied and the position of relay TR changes in position, the rectifier SCR is rendered nonconductive to thus drop away relay CH.

More particularly, and assuming the track T becomes occupied, relay TR is dropped away to the extent that its contact 16 changes in position from a closed front to a closed back contact. As the front contact 16 opens, the positive (+) energy for anode A is momentarily disconnected to cause the rectifier SCR to be rendered nonconductive in its characteristic deenergizing time of under one millisecond. The change relay CH is dropped away accordingly in that even though the positive (+) energy source is again connected when contact 16 closes at its back, the rectifier SCR remains nonconductive which causes the negative (−) energy source on cathode C to remain disconnected from anode A. According to the operation of the system, then, a positive (+) energy pulse is again supplied to gate G of rectifier SCR so that change relay CH can be again picked up to enable it to determine the change of position or condition of the 10G, 11G, and TR relays. The particular sequence of operation for pulsing the gate G of rectifier SCR is determined by the transmission from the control office as shown and described in the above mentioned Hailes et al. patent.

Having described a control circuit for a field start relay in a code type communication system, as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What we claim is:

1. In a supervisory control system, a plurality of binary devices at a particular location for selecting indication codes for transmission in the supervisory control system, each of the devices having contacts movable between front and back positions associated therewith actuated in response to a change in the condition of the associated device, a change registration relay for initiating transmission of indication codes in the supervisory control system, a switching rectifier having anode-cathode circuit and a gate electrode for turning the rectifier on for control of the relay to an energized condition only when the rectifier is turned on, circuit means for energizing the relay through the contacts of the devices and through the anode-cathode circuit of the switching rectifier connected in series, the circuit portion through the contacts being closed except during crossover time of movement of any of the contacts between front and back positions, and reset means controlled by the supervisory control system including the gate electrode of the rectifier for resetting the rectifier to a conducting condition and for resetting the relay to its normally energized condition whereby the rectifier is turned off by the crossover of the contacts and is not turned on again until reset by the reset means.

2. The combination according to claim 1 wherein said switching rectifier is a silicon controlled rectifier.

3. The combination according to claim 1 wherein the crossover time of the contacts is substantially greater than the time required to cause said rectifier to be rendered nonconductive when the anode circuit is interrupted, but is no greater than the release time of the relay.

References Cited by the Examiner
UNITED STATES PATENTS 3,151,311 9/1964 Spector et al. _____ 317—148.52

OTHER REFERENCES

Burke: "Stepper Driver Circuit," RCA Technical Notes, RCA TN No. 503, March 1962.

SAMUEL BERNSTEIN, *Primary Examiner.*